(12) United States Patent
Fan et al.

(10) Patent No.: US 10,768,014 B2
(45) Date of Patent: Sep. 8, 2020

(54) ENVIRONMENTAL PARAMETER MEASUREMENT SYSTEMS

(71) Applicant: METIS IP (SUZHOU) LLC, Suzhou (CN)

(72) Inventors: Junjun Fan, Shanghai (CN); Kan Li, Shanghai (CN); Shan Guan, Fremont, CA (US)

(73) Assignee: METIS IP (SUZHOU) LLC, Suzhou (CN)

(*) Notice: Subject to any disclaimer, the term of this patent is extended or adjusted under 35 U.S.C. 154(b) by 0 days.

(21) Appl. No.: 16/724,544

(22) Filed: Dec. 23, 2019

(65) Prior Publication Data

US 2020/0124444 A1   Apr. 23, 2020

Related U.S. Application Data

(63) Continuation of application No. 16/331,966, filed as application No. PCT/CN2016/098515 on Sep. 9, 2016, now Pat. No. 10,514,272.

(51) Int. Cl.
*G01D 3/036* (2006.01)
*G05D 23/19* (2006.01)
*G06F 17/10* (2006.01)

(52) U.S. Cl.
CPC ......... *G01D 3/036* (2013.01); *G05D 23/1917* (2013.01); *G06F 17/10* (2013.01)

(58) Field of Classification Search
None
See application file for complete search history.

(56) References Cited

U.S. PATENT DOCUMENTS

| 9,713,345 B2 | 7/2017 | Farine et al. |
| 10,303,139 B2 | 5/2019 | Chen et al. |
| 2014/0321503 A1 | 10/2014 | Niederberger et al. |

(Continued)

FOREIGN PATENT DOCUMENTS

| CN | 104067120 A | 9/2014 |
| EP | 2808650 A1 | 12/2014 |
| WO | 2018032511 A1 | 2/2018 |

OTHER PUBLICATIONS

International Search Report in PCT/CN2016/098515 dated May 4, 2017, 7 pages.
Written Opinion in PCT/CN2016/098515 dated May 4, 2017, 8 pages.

*Primary Examiner* — Jeffery S Zweizig
(74) *Attorney, Agent, or Firm* — Metis IP LLC

(57) ABSTRACT

The present disclosure discloses a method for compensating a measured environmental parameter. The method may include obtaining one or more sets of conditions associated with a heat generating device including an electric power value of the heat generating device. The method may further include, for each set of the one or more sets of conditions, obtaining a plurality of groups of measured data acquired by a first sensing device, and a plurality of groups of reference data, which are both associated with an environmental parameter corresponding to a power-on duration of the heat generating device. The method may further include determining, for each group of the plurality of groups of measured data and reference data, a deviation of the environmental parameter associated with the first sensing device between the measured data and the reference data, and determining a relationship between the deviation and the power-on duration of the heat generating device.

20 Claims, 10 Drawing Sheets

(56) References Cited

U.S. PATENT DOCUMENTS

| | | |
|---|---|---|
| 2015/0192477 A1 | 7/2015 | Sacchetti et al. |
| 2017/0108235 A1 | 4/2017 | Guan et al. |
| 2019/0253271 A1 | 8/2019 | Shi et al. |
| 2019/0265281 A1 | 8/2019 | Li et al. |

ENVIRONMENTAL PARAMETER MEASUREMENT SYSTEMS

CROSS-REFERENCE TO RELATED APPLICATIONS

This application is a continuation of U.S. patent application Ser. No. 16/331,966, filed on Mar. 9, 2019, which is a U.S. national stage under 35 U.S.C. § 371 of International Application No. PCT/CN2016/098515, filed on Sep. 9, 2016, designating the United States of America, the entire contents of each of which are incorporated herein by reference.

TECHNICAL FIELD

The present disclosure relates to environmental parameter measurement systems, and in particular, to systems for compensating current environmental measurement data.

BACKGROUND

In recent years, people have become more concerned about environmental conditions of places for living, working and learning. There are already some environmental parameter measurement systems that can measure environmental indicators such as temperature, humidity, and solid particles. It is desirable to provide environmental parameter measurement systems for automatically correcting environmental measurement data in real time so that people can accurately know about the surrounding environmental conditions.

SUMMARY

According to an aspect of the present disclosure, a system is provided. The system may include at least one storage device including a set of instructions and at least one processor in communication with the at least one storage device. When executing the set of instructions, the at least one processor may be configured to cause the system to obtain one or more sets of conditions associated with a heat generating device. Each set of the one or more sets of conditions may include an electric power value of the heat generating device. For each set of the one or more sets of conditions, the at least one processor may be configured to obtain a plurality of groups of measured data associated with an environmental parameter corresponding to a set of time points in a power-on duration of the heat generating device. The plurality of groups of measured data may be acquired by a first sensing device. The at least one processor may be further configured to obtain a plurality of groups of reference data associated with the environmental parameter corresponding to the set of time points in a power-on duration of the heat generating device. The plurality of groups of measured data reference data may be acquired by a second sensing device. The at least one processor may be further configured to determine, for each group of the plurality of groups of measured data and reference data, a deviation of the environmental parameter associated with the first sensing device between the measured data and the reference data, and determine a relationship between the deviation of the environmental parameter and the power-on duration of the heat generating device.

In some embodiments, the environmental parameter may be temperature, relative humidity, absolute humidity, or pressure.

In some embodiments, a first distance between the first sensing device and the heat generating device may be less than or equal to a first threshold.

In some embodiments, a second distance between the second sensing device and the heat generating device may be greater than or equal to a second threshold.

In some embodiments, the second sensing device may include at least one of a temperature sensor, a humidity sensor, or a pressure sensor.

In some embodiments, to determine the relationship among the deviation of the environmental parameter and the power-on duration of the heat generating device, the at least one processor may be further configured to cause the system to determine, according to a fitting algorithm, the relationship based on the set of time points during the power-on duration and the deviation of the environmental parameter associated with the plurality of groups of measured data and reference data.

In some embodiments, the fitting algorithm may include at least one of an interpolation algorithm or an extrapolation algorithm.

In some embodiments, the extrapolation algorithm may include at least one of a linear extrapolation algorithm, an exponential extrapolation algorithm, a growth curve algorithm, or a trend extrapolation algorithm.

In some embodiments, the interpolation algorithm may include at least one of a Newton's algorithm, a linear interpolation algorithm, or a polynomial interpolation algorithm.

In some embodiments, the at least one processor may be further configured to cause the system to obtain a set of target conditions associated with the heat generating device, a target power-on duration of the heat generating device, and a target measured value of the environmental parameter that is measured by the first sensing device. The at least one processor may be further configured to cause the system to determine a target deviation based at least in part on the set of target conditions, the target time, and the relationship. The at least one processor may be further configured to cause the system to determine a corrected measured value of the environmental parameter based on the target measured value and the target deviation.

According to another aspect of the present disclosure, a method is provided. The method may include obtaining one or more sets of conditions associated with a heat generating device, each set of the one or more sets of conditions including an electric power value of the heat generating device. The method may further include, for each set of the one or more sets of conditions, obtaining a plurality of groups of measured data associated with an environmental parameter corresponding to a set of time points in a power-on duration of the heat generating device. The measured data may be acquired by a first sensing device. The method may further include obtaining a plurality of groups of reference data associated with the environmental parameter corresponding to the set of time points in a power-on duration of the heat generating device. The reference data may be acquired by a second sensing device. The method may further include determining, for each group of the plurality of groups of measured data and reference data, a deviation of the environmental parameter associated with the first sensing device between the measured data and the reference data. The method may further include determining a relationship between the deviation of the environmental parameter and the power-on duration of the heat generating device.

According to yet another aspect of the present disclosure, a non-transitory computer readable medium is provided. The non-transitory computer readable medium may include a set of instructions. When executed by at least one processor, the set of instructions may direct the at least one processor to effectuate a method. The method may include obtaining one or more sets of conditions associated with a heat generating device, each set of the one or more sets of conditions including an electric power value of the heat generating device. The method may further include, for each set of the one or more sets of conditions, obtaining a plurality of groups of measured data associated with an environmental parameter corresponding to a set of time points in a power-on duration of the heat generating device. The measured data may be acquired by a first sensing device. The method may further include obtaining a plurality of groups of reference data associated with the environmental parameter corresponding to the set of time points in a power-on duration of the heat generating device. The reference data may be acquired by a second sensing device. The method may further include determining, for each group of the plurality of groups of measured data and reference data, a deviation of the environmental parameter associated with the first sensing device between the measured data and the reference data. The method may further include determining a relationship between the deviation of the environmental parameter and the power-on duration of the heat generating device.

In part of the additional features of the present disclosure will be set forth in the description which follows. And in part of the additional features of the present disclosure will become apparent to those skilled in the art upon examination of the following and the accompanying drawings. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
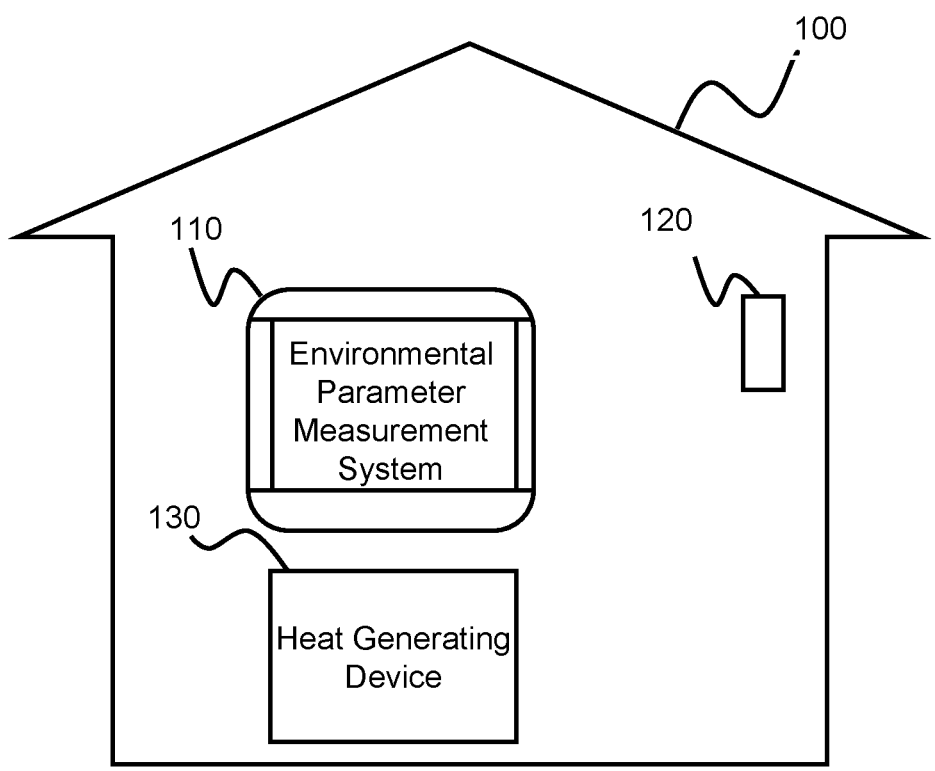
FIG. 1 is a schematic diagram illustrating an application scenario of an environmental parameter measurement system according to some embodiments of the present disclosure.

In order to illustrate the technical solutions related to the embodiments of the present disclosure, brief introduction of the drawings referred to in the description of the embodiments is provided below. Obviously, drawings described below are only some illustrations or embodiments of the present disclosure. Those having ordinary skills in the art, without further creative efforts, may apply the present disclosure to other similar scenarios according to these drawings. It is to be understood that the terms of the present disclosure are not intended to limit the scope of the present disclosure in any way. Unless stated otherwise or obvious from the context, the same reference numeral in the drawings refers to the same structure and operation.

As used herein, the singular forms "a," "an," and "the" may be intended to include the plural forms as well, unless the context clearly indicates otherwise. In general, it will be further understood that the terms "comprise," "comprises," and/or "comprising," "include," "includes," and/or "including," when used in this specification, specify the presence of stated steps, and elements, but do not preclude the presence or addition of one or more other steps, elements, thereof. The methods or devices may also include other steps or elements.

Some modules of the system may be referred to in various ways according to some embodiments of the present disclosure, however, any number of different modules may be used and operated in a client terminal and/or a server. The modules are for the purpose of illustration only, and different aspects of the systems and methods may be performed in different modules.

The flowcharts used in the present disclosure illustrate operations that systems implement according to some embodiments in the present disclosure. It is to be expressly understood, the operations above or below may be implemented not in order. Conversely, the operations may be implemented in inverted order, or simultaneously. Moreover, one or more other operations may be added to the flowcharts, or one or more operations may be removed from the flowcharts.

The systems and methods described in the present disclosure are related to the systems and methods described in International Patent Application No. PCT/CN2015/075923 entitled "ENVIRONMENTAL CONTROL SYSTEM" filed on Apr. 3, 2015, International Patent Application No. PCT/CN2015/080160 entitled "ENVIRONMENTAL CONTROL SYSTEM" filed on May 29, 2015, International Patent Application No. PCT/CN2016/096091 entitled "SYSTEM AND METHOD FOR CONTROLLING APPLIANCES" filed on Aug. 19, 2016, International Patent Application No. PCT/CN2016/096095 entitled "CONTROL SYSTEM", and International Patent Application No. PCT/CN2016/096097 entitled "ELECTRIC POWER MANAGEMENT SYSTEM AND METHOD" filed on Aug. 19, 2016, the contents of which are hereby incorporated by reference.

FIG. 1 is a schematic diagram illustrating an application scenario of an environmental parameter measurement system 110 according to some embodiments of the present disclosure. In some embodiments, the environmental parameter measurement system 110 may be installed inside a house building 100. The house building 100 may be a residential building, a public building, and/or an industrial building, or the like. In some embodiments, the parts or components of the environmental parameter measurement system 110 may be mounted on different locations, rooms, buildings, or other places. A sensing device, a data obtaining device, a data processing device, a data storage and other devices in the environmental parameter measurement system 110 may communicate with each other via a wireless connection or a wired connection.

In some embodiments, the environmental parameter measurement system 110 may measure one or more environmental parameters and compensate the measured value of the environmental parameters. In some embodiments, the environmental parameter may be temperature, relative humidity, absolute humidity, a gas pressure, a partial pressure of a certain gas (e.g., nitrogen, oxygen, or carbon dioxide, etc.), particulate matter in the air, etc. As an example, the measured value of the environmental parameter may be a current measured value (also referred to as a "target measured value") of the environmental parameter.

It may also exit a second sensing device 120 and a heat generating device 130 inside the building 100. The heat generating device 130 may be a device generating heat and dissipating the heat outward during operation. In some embodiments, the heat may be generated based on a thermal effect of a current caused by the operation of the heat generating device 130. In some embodiments, the heat generating device 130 may be a powered device, such as a household electric appliance. As an example, the household electric appliance may be an air conditioner, a television, a temperature and humidity measuring device, a control panel, etc. In some embodiments, the environmental parameter measuring system 110 may be integrated with the air conditioner, the television, the temperature and humidity measuring device, or the control panel. In some embodiments, when the environmental parameter measurement system 110 is integrated with the control panel, the components of the environmental parameter measurement system 110 for sensing, collecting data, and displaying data may be integrated into the control panel. For example, the temperature of the environment surrounding the control panel may be measured by a built-in temperature sensor in the control panel. The control panel may upload the measured temperature data to a network server for processing. The control panel may also download the processed data from the network server and display the downloaded data via an LCD screen or an LED screen.

The second sensing device 120 may collect reference data of one or more environmental parameters, such as a temperature reference data, a humidity reference data, etc. The reference data may include one or more measured values of the environmental parameter under different measurement conditions. The measurement conditions may have an effect on the measured value of the environmental parameter. The measurement conditions may include the material about a building wall, the electric power of the heat generating device 130, the power-on duration of the heat generating device 130, the measured value of the current ambient temperature, and the measured value of the current indoor humidity, etc.

In some embodiments, the second sensing device 120 may be deployed at a position farther from the heat generating device 130. The position farther from the heat generating device 130 may be a position located at a distance (also referred to as a "second distance") not less than a threshold D1 (also referred to as a "second threshold") with the heat generating device 130 distance. Wherein, the value of D1 may range from 0 meters to 3 meters, or 0 meters to 5 meters, or at least 1.5 meters. In some embodiments, the influence of the heat generating device 130 on the reference data measured by the second sensing device 120 may be negligible. In some embodiments, when comparing the standard data measured by the second sensing device 120 along with the heat generating device 130 with the standard data measured by the second sensing device 120 without the heat generating device 130, and the difference between them in the range of 1%, 2%, 3%, 5%, 8%, or 10%, or the like, it may be considered that the effect of the heat generating device 130 on the reference data measured by the second sensing device 120 may be negligible. In some embodiments, the second sensing device 120 may be used for correction of the environmental parameter measurement system 110 before leaving a factory. In some embodiments, the environmental parameter measurement system 110 may not include the second measurement device 120.

As an example, the reference data may include a measured value of the same current ambient temperature, an electric power of the same heat generating device, and a position relative to the system 110 or a portion thereof (e.g., the first sensing device 201 of FIG. 2, etc.), reference data of the environmental parameter measured by the second sensing device 120 (e.g., temperature reference data and humidity reference data, etc.) under difference power-on duration conditions of the heat generating device. In some embodiments, the deviation of the environmental parameter measured value may be determined according to the reference data of the environmental parameter. In some embodiments, a reference environmental parameter time table may be generated, for example, a reference temperature time table, a reference humidity time table, etc., according to the reference data of the environmental parameter or the deviation of the environmental parameter measured value. In some embodiments, the reference temperature time table may represent a relationship between a reference temperature and a power-on duration. In some embodiments, the reference humidity time table may represent a relationship between reference humidity and power-on duration.

The second sensing device 120 may include an infrared sensor, a pressure sensor, a temperature sensor, a humidity sensor, or a gas sensor, or the like, according to the measured environmental parameter. The second sensor 120 may include a resistive sensor, an inductive sensor, a capacitive sensor and a potential sensor according to the working principle for the second sensor 120.

Figure 2:
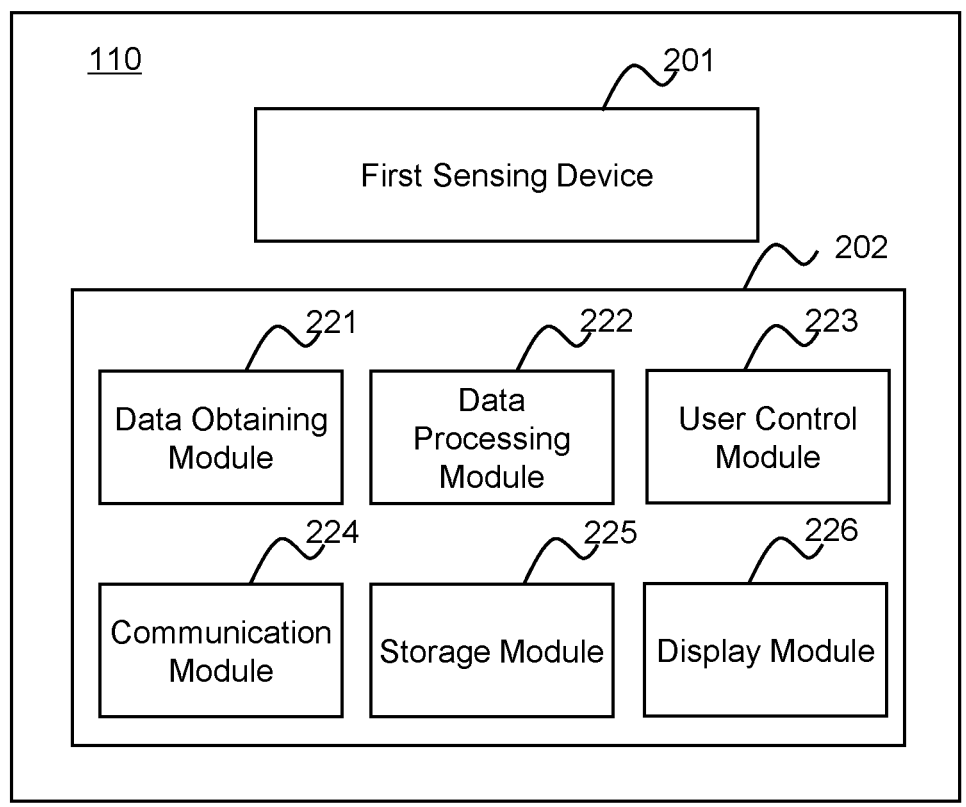
FIG. 2 is a schematic diagram illustrating an environmental parameter measurement system according to some embodiments of the present disclosure.

FIG. 2 is a schematic diagram illustrating an environmental parameter measurement system 110 according to some embodiments of the present disclosure. The environmental parameter measurement system 110 may include a first sensing device 201 and an environmental parameter compensating device 202. The environmental parameter compensating device 202 may include a data obtaining module 221, a data processing module 222, a user control module 223, a communication module 224, a storage module 225 and a display module 226.

The first sensing device 201 may collect one or more measured values of the environmental parameter. The environmental parameter may include temperature, humidity, pressure, and partial pressure of gas (e.g., nitrogen, oxygen, or carbon dioxide, etc.). In some embodiments, the first sensing device may include one or more first sensors, such as a temperature sensor, a humidity sensor, etc. The first sensing device 201 may include a pressure sensor, a temperature sensor, a humidity sensor, a gas sensor, or the like, or any combination thereof. The first sensing device 201 may also include an infrared sensor, a resistive sensor, an inductive sensor, a capacitive sensor, and a potential sensor. As an example, the first sensing device 201 may measure current data of the temperature and/or current data of the humidity. In some embodiments, the first sensing device 201 may be deployed in the vicinity the heat generating device 130. In some embodiments, the "vicinity" of the heat generating device 130 may be a position where a distance (also referred to as a "first distance") between the position and the heat generating device 130 is less than a threshold D2 (also referred to as a "first threshold"). D2 may be less than D1. As an example, the first sensing device 201 may be located inside the heat generating device 130. For example, the heat generating device 130 may be a control panel; and the first sensing device 201 may be located outside or inside the control panel housing. In some embodiments, the first sensing device 201 located near the heat generating device 130 may indicate that one or more measured values of the environmental parameter collected by the first sensing device 201 may include an error caused by the operation of the heat generating device 130.

The data obtaining module 221 may acquire data. The data may relate to the environmental parameter measured value or the measurement condition. The environmental parameter may be temperature, humidity, air pressure, partial pressure of a certain gas (nitrogen, oxygen or carbon dioxide, etc.), particulate matter content in the air, or the like. The measurement condition may be a condition affecting the measured value of the environmental parameter, for example, the measured value of the current ambient temperature, the measured value of the current ambient humidity, the material about the building wall, the electric power of the current heat generating device, the power-on duration of the current heat generating device, or the like. In some embodiments, the measured value of the current ambient temperature may be obtained by the measurement of the first sensing device 201.

In some embodiments, the data obtaining module 221 may be in communication with the first sensing device 201, the second sensing device 120, and/or the heat generating device 130. As an example, the data obtaining module 221 may be in communicate with the first sensing device 201, and acquire data collected by the first sensing device 201. As another example, data obtaining module 221 may communicate with the heat generating device 130 to obtain the electric power and/or the power-on duration data for the heat generating device 130. In some embodiments, the method for the communication may include a wired connection, a wireless connection, or any combination thereof.

In some embodiments, the data obtaining module 221 may obtain data from an external data source. The external data source may be a device collecting or storing data. In some embodiments, the external data source may be at least one of a cloud database, and a storage device. As another example, the external data source may be a computer device such as a cell phone, tablet computer, computer, smart watch, or the like. As an example, the data obtaining module 221 may obtain the reference data of the environmental parameter, such as temperature reference data and/or humidity reference data, from an external data source.

In some embodiments, the external data source may be connected to data obtaining module 221 via the wired manners. As an example, wired access may be implemented in the form of a fiber, or a cable, or the like, or any combination thereof. In some other embodiment, the external data source may be connected to the data obtaining module 221 via the wireless manners. As an example, wireless access may be implemented via a Bluetooth, a wireless local area network (WLAN), a Wi-Fi, a WiMax, a near field communication (NFC), a ZigBee, a mobile network (2G, 3G, 4G, 5G network, etc.), or other connection manners, or any combination thereof. In some embodiments, the external data source and the data obtaining module 221 may be connected by a combination of one or more wired manners and one or more wireless manners.

In some embodiments, the data obtaining module 221 may be connected with the data processing module 222, the storage module 225, the communication module 224, and/or the user control module 223. As an example, the data obtaining module 221 may be transferred the collected data to the data processing module 222, and/or to the storage module 225. As another example, the user may control the manner for the data obtaining performed by the data obtaining module 221 controlled by the user control module 223. For example, the manner for the data obtaining may be continuous, periodic, triggered by a triggering event, or the like, or any combination thereof. In some embodiments, the triggering event may be set according to a default setting of the system 110, provided by the user, obtained by the system 110 through a machine learning, etc. The environmental parameter measurement system 110 may include or otherwise be used (e.g., retrieved from an external storage device, etc.) a library containing a plurality of trigger events. In some embodiments, the trigger event may be a threshold value reached by the current measured value of the environmental parameter or the reference measured value of an environmental parameter, the threshold reached by an operating parameter (e.g., output voltage, etc.) of the environmental parameter measurement system 110, an emergency condition (e.g., power outage, etc.), an instruction received by the environmental parameter measurement system 110 from the user, etc.

Communication module 224 may be connected with the data obtaining module 221, the data processing module 222, the user control module 223, the storage module 225, and/or the display module 226. In some embodiments, the communication module 224 may support wired communication. The wired communication may be implemented in the form of the optical fiber or the cable. In some embodiments, the communication module 224 can support wireless communication. The wireless communication may be implemented by a Bluetooth, a wireless local area network (WLAN), a Wi-Fi, a WiMax, a near field communication (NFC), a ZigBee, a mobile network, or other connection manners. In some embodiments, the communication module 224 can support wired communication and wireless communication. As an example, the data obtaining module 221 may transmit the collected data to the data processing module 222 via the communication module 224.

The data processing module 222 may process the data. The data may include the reference data of the environmental parameter and/or the current measured data of the environmental parameter. In some embodiments, the data processing module 222 may perform a preprocessing operation on the data. The preprocessing operation may include processing dark currents, removing dead pixels, denoising, performing geometric corrections, etc. In some embodiments, the data processing module 222 may perform operations, such as correction, on the data. In some embodiments, the data processing module 222 may generate the compensated data of the current measured value of the environmental parameter, and correct the current measured value of the environmental parameter based on the compensated data to obtain the corrected measured value of the environmental parameter. The compensated data may be the deviation of the current measured value of the environmental parameter.

In some embodiments, the data processing module 222 may transmit the processed data to the display module 226. In some embodiments, the data processing module 222 can transmit the processed data to the cloud database through the communication module 224.

In some embodiments, the data processing module 222 may include a processor. The processor may include a central processing unit (CPU), a programmable logic device (PLD), a special integrated circuit (ASIC), a microprocessor, an embedded system on chip (SOC), a digital signal processor (DSP), or the like, or any combination thereof. The two or more processors may be coupled to one hardware device. The processor may implement the data processing by a variety of ways, for example, hardware, software or a combination of the hardware and the software.

The user control module 223 may be connected with the data obtaining module 221, the data processing module 222, the communication module 224, the storage module 225, and/or the display module 226. In some embodiments, the user control module 223 may receive an instruction or operation from a user device. The user device may include one or more of a smartphone, a tablet computer, a smart watch, a remote controller, a control panel, or the like. The user control module 223 may control the operation of the one or more module in the environmental parameter compensating device 202. In some embodiments, the user control module 223 may control the operating state of the communication module 224. For example, the connection of the data obtaining module 221 and the communication module 224 may be on and off by the user control module 223 by the user. In some embodiments, the user control module 223 may control a related parameter. The parameters may include time, display content, and system operating status. As an example, both the temperature before the compensation and the temperature after the compensation may be displayed by the display module 226 allowed by the user control module 223 via the user. As another example, the user may control the display module 226 to display only the temperature after the compensation.

Display module 226 may display data. In some embodiments, the display module 226 may display the environmental parameter data. In some embodiments, the display module 226 may be connected with the data obtaining module 221, the data processing module 222, and/or the storage module 225. As an example, the display module 226 may display the measured value of the environmental parameter before the compensation, and/or the measured value of the environmental parameter after the compensation. As an example, the display module 226 may display data processed by the data processing module 222. As another example, the display module 226 may receive and display data from the storage module 225.

In some embodiments, the display module 226 may display data related to a working state of the environmental parameter measurement system 110. As an example, the display module 226 may display the system in a normal working state. As another example, the display module 226 may display the system in an abnormal working state and transmitting a warning signal. As an example, when the current measured value (e.g., the current temperature value) of the environmental parameter of the system reaches the threshold, the system may be in an abnormal working state. In some embodiments, the threshold may be set by the system 110 based on the default settings or the results of the machine learning, or provided by the user. In some embodiments, the threshold of a certain environmental parameter may be varied with the change of other environmental parameters. For example, when the ambient humidity increases, the temperature range over which the system operates normally may be reduced. In some embodiments, the warning signal may be an optical signal, an acoustic signal, or a combination of a plurality of signals. In some embodiments, the display module 226 may also display network connection status of a device. In some embodiments, the display module 226 may also display data of running time of a device.

The storage module 225 may be connected with and exchange information with the data obtaining module 221, the data processing module 222, the user control module 223, and/or the display module 226. In some embodiments, the storage module 225 may receive data from the above module or transmit data to the above module. As an example, storage module 225 may receive and store data transmitted by the data obtaining module 221 and the data processing module 222. As another example, the storage module 225 may store the instruction data transmitted by the user control module 223.

In some embodiments, the storage module 225 may include one or more storage devices. The storage device herein may include a hard disk, a floppy disk, a magnetic tape, any other magnetic medium; a compact disk read-only memory (CD-ROM), a digital video disc (DVD), a digital video disc ROM (DVD-ROM), any other optical medium; a punch card, any other physical storage medium containing aperture mode; a random access memory (RAM), a dynamic random access memory (DRAM), a static random access memory (SRAM), a bubble memory, a thin film memory, a magnetic plated wire memory, a phase change memory, a flash memory, a cloud storage, a cloud server, and any other memory slice, etc.

It should be noted that the above description of the environmental parameter measurement system 110 is merely provided for convenience of description and not intended to limit the present disclosure to the scope of the embodiments. For persons having ordinary skills in the art, modules may be combined in various ways, or connected with other modules as sub-systems. Various variations and modifications may be made under the teachings of the present disclosure. However, those variations and modifications may not depart from the spirit and the scope of the present disclosure.

Figure 3:
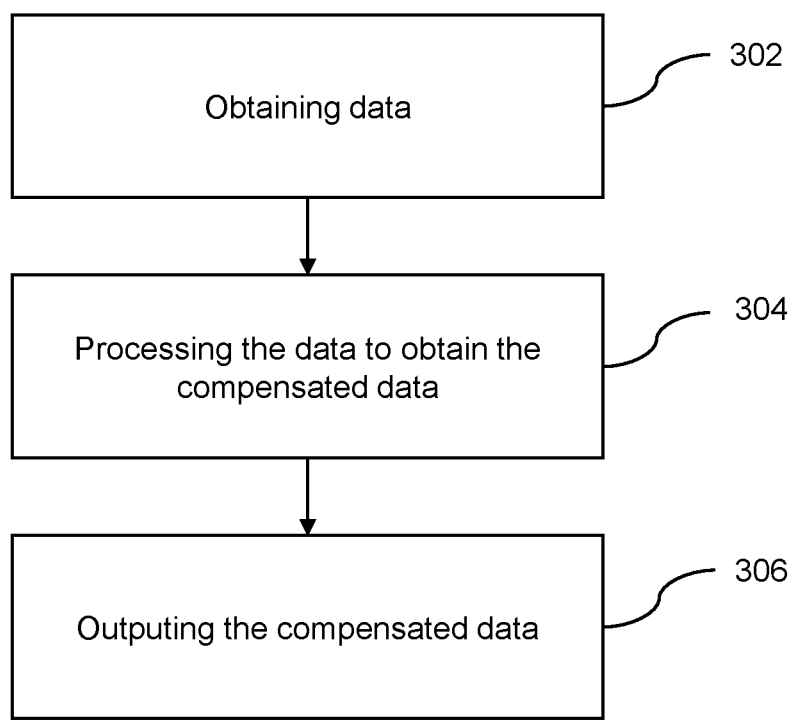
FIG. 3 is an exemplary flowchart illustrating an exemplary process for compensating an environmental parameter according to some embodiments of the present disclosure.

FIG. 3 is an exemplary flowchart illustrating an exemplary process for compensating an environmental parameter according to some embodiments of the present disclosure. In step 302, the environmental parameter compensating device 202 may obtain data. The process of obtaining data may be implemented by the data obtaining module 221. In some embodiments, the current measured value of the environmental parameter may be obtained, for example, the measured value of the current temperature. In some embodiments, the reference data of the environmental parameter may be obtained. In some embodiments, the environmental reference data may be collected by the second sensing device 120. In some embodiments, the environmental reference data may be transmitted to the data obtaining module 221 by an external data source.

In step 304, the environmental parameter compensating device 202 may process the obtained data to obtain the compensated data. The process of processing data may be implemented by the data processing module 222. The processing on the data may include a preprocessing operation on the data, a compensating operation on the data, or the like, or any combination thereof. The preprocessing operation on the data may include denoising, filtering, dark current processing, geometric correction, or the like, or any combination thereof. In some embodiments, the compensated data of the current measured value of the environmental parameter may be obtained according to the reference data of the environmental parameter. For example, the current measured value of the environmental parameter may be compensated according to the compensated data of the current measured value of the environmental parameter to obtain the measured value of the environmental parameter after the compensation.

In step 306, the environmental parameter compensating device 202 may output the compensated data. In some embodiments, the compensated data may be displayed by the display module 226. In some embodiments, the data may be transmitted to any external device, such as a database, a terminal, etc., connected with the environmental parameter measurement system 110. The database may be located on the network and collect the compensated data from one or more environmental parameter measurement system 110. The terminal may be a user device, for example, a smartphone, a tablet computer, a laptop computer, a wearable device, etc.

It should be noted that the above description of the environmental parameter compensating process is merely provided for convenience of description and not intended to limit the present disclosure to the scope of the embodiments. It should be understood that for persons having ordinary skills in the art, modules may be combined in various ways, or connected with other modules as sub-systems. Various variations and modifications may be made under the teachings of the present disclosure. However, those variations and modifications may not depart from the spirit and the scope of the present disclosure. For example, the compensated data obtained in step 304 may be returned to step 302 for processing again.

Figure 4:
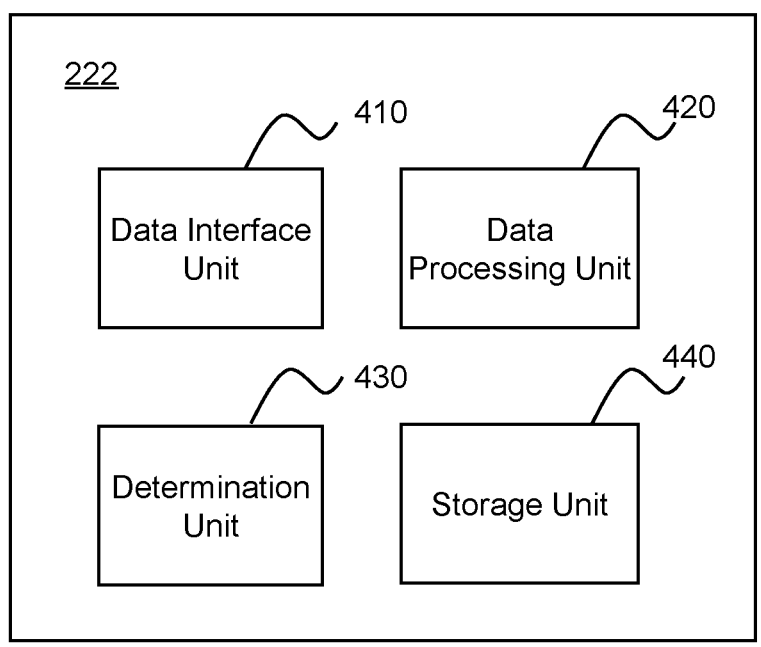
FIG. 4 is a schematic diagram illustrating a data processing module according to some embodiments of the present disclosure.

FIG. 4 is a schematic diagram illustrating the data processing module 222 according to some embodiments of the present disclosure. The data processing module 222 may include a data interface unit 410, a data processing unit 420, a determination unit 430, and a storage unit 440.

The data interface unit 410 may receive and/or send data related to the environmental parameter. The data may be the measured value of the environmental parameter or data related to the measurement condition. The environmental parameter may be temperature, humidity, air pressure, partial pressure, particulate matter content in the air, etc. The measurement condition may be a condition affecting the measured value of the environmental parameter, for example, the measured value of the ambient temperature, the material of the building wall, the electric power of the heat generating device 130, the operating voltage of the heat generating device 130, the power-on duration of the heat generating device 130, etc. Data interface unit 410 may be connected with the data obtaining module 221, the storage module 225, the display module 226, the data processing unit 420, the determination unit 430, and/or the storage unit 440. As an example, data interface unit 410 may obtain data from the data obtaining module 221 and/or the storage module 225. As another example, the data interface unit 410 may obtain the reference data and transmit the obtained reference data to the data processing unit 420, the determining unit 430, or the storage unit 440.

The data processing unit 420 may perform analysis and processing on the received data. For example, the data processing unit 420 may receive data from the data interface unit 410 and/or the storage unit 440 and perform analysis processing. As an example, the data received by the data interface unit 420 may include the reference data of the environmental parameter and the current measured value of the environmental parameter. In some embodiments, the data processing unit 420 may preprocess the received data. As an example, the preprocessing may include filtering, dark current, removing noise, geometric correction, or the like, or any combination thereof. In some embodiments, the data processing unit 420 may determine the compensated data of the current measured value of the environmental parameter. As an example, the data processing unit 420 may analyze the received reference data to generate a reference temperature time relationship and a quasi-reference temperature time relationship. The quasi-reference temperature time relationship may be one or more temperature time relationships obtained by screening in a reference temperature time table. In some embodiments, the data processing unit 420 may perform a fitting calculation on the reference temperature time relationship to generate a compensating temperature time table. The compensating temperature time relationship may be generated based on the one or more quasi-reference temperature time relationships, and contain the temperature time relationship of the compensated data of the current measured value of the environmental parameter. The compensating temperature time relationship may be used as a reference for the compensation of the current measured value of the environmental parameter. The reference temperature time relationship or the quasi-reference temperature time relationship may be in the form of a table, such as a reference temperature time table, a quasi-reference temperature time table, etc. The reference temperature time relationship or the quasi-reference temperature time relationship may be in the form of a graph, such as a reference temperature time diagram, a quasi-reference temperature time diagram, etc.

The determination unit 430 may be connected with the data interface unit 410, the data processing unit 420, and/or the storage unit 440. In some embodiments, the determination unit 430 may select an algorithm for the data processing unit 420 to perform a data processing. As an example, the determining unit 430 may select an algorithm for a compensating temperature time relationship generated by the quasi-reference temperature time relationship. The algorithm may include an interpolation method and an extrapolation method, or the like, or any combination thereof. The interpolation methods may include a Newton's method, a linear interpolation method, a polynomial interpolation method, or the like, or any combination thereof. The extrapolation method may include a linear extrapolation method, an exponential extrapolation method, a growth curve method, a trend extrapolation method, or the like, or any combination thereof.

The storage unit 440 may store data or related parameters, etc. The stored data may be data in various forms, such as a numerical value, a signal, a command, an algorithms, a program, or the like, or any combination thereof. In some embodiments, the storage unit 440 may include a fixed storage system (e.g., a magnetic disk), a mobile storage system (e.g., a universal serial bus (USB) interface, an interface of a firewire port, and/or a drive of a disk drive type, etc.). The storage unit 440 may include a hard disk, a floppy disk, a random access memory, a dynamic random access memory, a static random access memory, a bubble memory, a thin film memory, a magnetic plate line memory, a phase change memory, a flash memory, a cloud disk, or the like, or any combination thereof.

In some embodiments, the storage unit 440 may be connected with the data interface unit 410, the data processing unit 420, and/or the determination unit 430, and receive data from one or more of the above units, or transmit data to one or more of the above units. As an example, the storage unit 440 may store data transmitted by the data interface unit 410. As another example, the determining unit 430 may select one or more algorithms stored in the storage unit 440 as an algorithm for the data processing performed by the data unit. The storage unit 440 may store temporary data, i.e., dump data for future data processing. The storage unit 440 may store the final data, i.e., store a result of the final data processing.

It should be noted that the above description of the data processing module 222 is merely provided for convenience of description and not intended to limit the present disclosure to the scope of the embodiments. For persons having ordinary skills in the art, modules may be combined in various ways, or connected with other modules as sub-systems. Various variations and modifications may be made under the teaching of the present disclosure. However, those variations and modifications may not depart from the spirit and scope of this disclosure.

Figure 5:
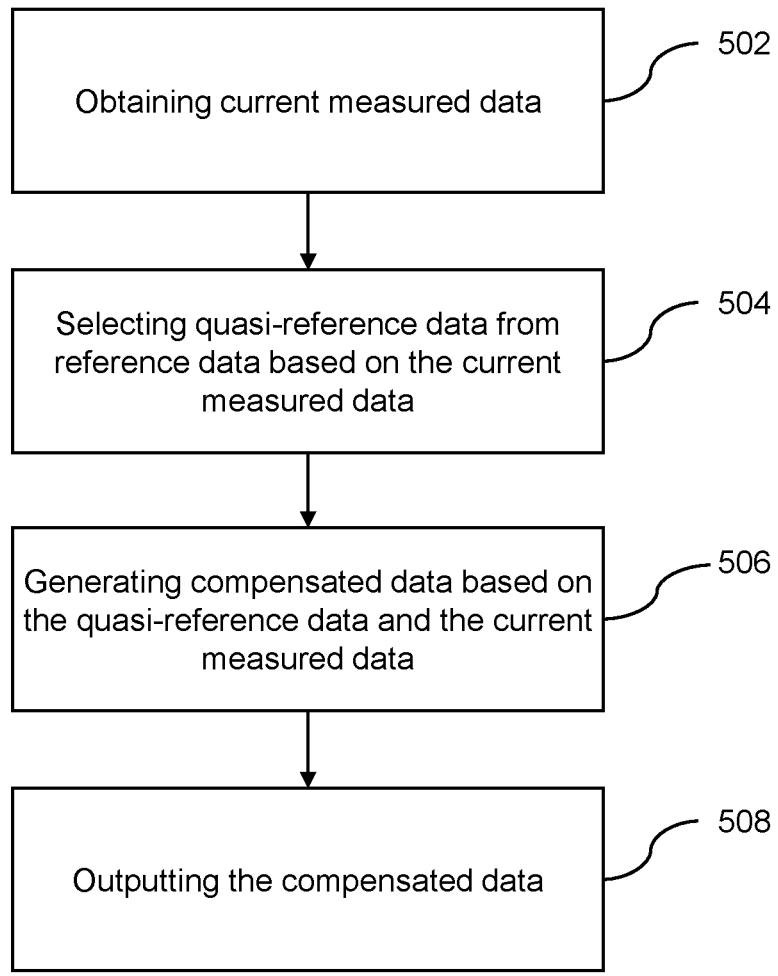
FIG. 5 is an exemplary flowchart illustrating a process of compensating the environmental parameter according to some embodiments of the present disclosure.

FIG. 5 is an exemplary flowchart illustrating a process of compensating the environmental parameter according to some embodiments of the present disclosure. In some embodiments, the compensation process of the environmental parameter may be implemented by the data processing module 222.

In step 502, the current measured data may be obtained. The measured data may include the current measured data of the environmental parameter, such as a current measured value of temperature, a current measured value of humidity, etc. The current measured data may include a measurement condition of a current environmental parameter, for example, the current electric power value of the heat generating device 130, the current power-on duration (also referred to as "target power-on duration) of the heat generating device 130, the measured value of the current ambient temperature, or the like, or any combination thereof. In some embodiments, the measurement condition may also be referred to as "a set of target conditions". In some embodiments, the current measured data may be obtained by the first sensing device 201.

In step 504, the quasi-reference data may be selected from the reference data based on the current measured data. In some embodiments, the reference data may include reference measured data of an environmental parameter under different measurement conditions, for example, powers of different heat generating devices, power-on durations of different heat generating devices, or under the conditions of the measured value of different reference ambient temperatures, the reference measured data of the environment parameter. The reference measured data of the environmental parameter may be obtained according to the process shown in FIG. 8 and its description. In some embodiments, the measurement condition that is closer to the current measured data may be determined according to the current measured data, and the reference data under the condition may be selected as the quasi-reference data. The "closer" as used herein may indicate the ratio of one or more measurement conditions (e.g., ambient temperature, humidity or an electric power value) of the temperature time relationship to the current corresponding measurement condition may be within a range, for example, 95% to 105%, 90% to 110%, or 85% to 115%, etc.

In step 506, the compensated data may be generated based on the quasi-reference data and the current measured data. In some embodiments, the compensated data of the current measured data may be generated according to the quasi-reference data. The compensated data may be generated according to the current measured data and the compensated data.

In step 508, the compensated data may be output. In some embodiments, the compensated data may be output by the display module 226. In some embodiments, the compensated data may be output to the storage module 225 for storage.

It should be noted that the above description of the environmental parameter compensating process is merely provided for convenience of description and not intended to limit the present disclosure to the scope of the embodiments. It will be understood that for persons having ordinary skills in the art, modules may be combined in various ways, or connected with other modules as sub-systems. Various variations and modifications may be made under the teachings of the present disclosure. However, those variations and modifications may not depart from the spirit and the scope of the present disclosure. For example, other operations or determinations may be added between the step 502 of obtaining the measurement data and the step 508 of outputting the compensated data. For example, the obtained current measured data may be stored and backed up. Similarly, a storage backup step may be added between any two steps in the process of the FIG. 5.

Figure 6:
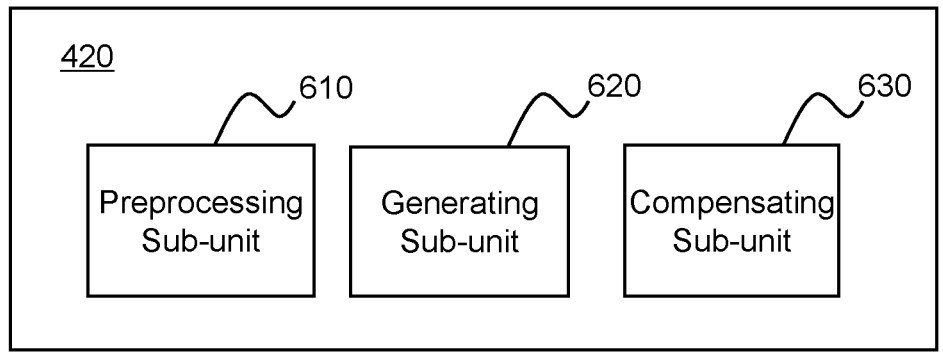
FIG. 6 is a schematic diagram illustrating a data processing unit according to some embodiments of the present disclosure.

FIG. 6 is a schematic diagram illustrating the data processing unit 420 according to some embodiments of the present disclosure. The data processing unit 420 may include a preprocessing sub-unit 610, a generating sub-unit 620, and a compensating sub-unit 630.

The preprocessing sub-unit 610 may perform preprocessing operations on the received data. In some embodiments, the preprocessing sub-unit 610 may perform on filtering, processing dark current, removing noise, and geometric correction, or the like, or any combination thereof. In some embodiments, the preprocessing sub-unit 610 may filter the received data to select the required data. In some embodiments, the preprocessing sub-unit 610 may be connected with the generating sub-unit 620. As an example, the preprocessing sub-unit 610 may transfer the pre-processed data to the generating sub-unit 620.

The generating sub-unit 620 may determine the reference temperature time relationship. In some embodiments, the generating sub-unit 620 may determine the relationship between the reference temperature and the running time of the heat generating device 130 (referred to as "the reference temperature time relationship") according to the reference data. In some embodiments, the reference data may be obtained by the second sensing device 120. As an example, the generating sub-unit 620 may determine the relationship between the reference temperature and the time under different measurement conditions, with the reference data under different measurement conditions. In some embodiments, the measurement condition may be a combination of the power of the heat generating device 130 and the measured value of the reference ambient temperature. As an example, the measured value of the reference ambient temperature may have four temperature values including $T_A$, $T_B$, $T_C$, and $T_D$, and the power of the device may have three electric power values including $P_1$, $P_2$, and $P_3$. The different measurement conditions may be twelve kinds of combinations of the aforementioned four temperature values and the aforementioned three electric power values. The reference temperature data of the heat generating device 130 under different power-on duration conditions may be respectively measured based on the 12 combinations, and the 12 reference temperature time relationship tables may be generated. As an example, the selection of $T_A$, $T_B$, $T_C$, and $T_D$ may be arbitrary, or determined based on the possible upper temperature limits and the possible lower temperature limits of the actual use environment of heat generating device 130. For example, the $T_A$ and the $T_D$ may be selected as the upper temperature limit and the lower temperature limit, respectively. The $T_B$ and the $T_C$ may be determined as follows: in a state of $P_1$, under the condition of the $T_D$, a required time from a stable temperature deviation in the non-operating state of the heat generating device 130 to the stable temperature deviation in the running state of the heat generating device 130 for the first time, may be determined as $t_a$; in the state of the P1, under the condition of the $T_A$, the required time from a stable temperature deviation in the non-operating state of the heat generating device 130 to the stable temperature deviation in the running state of the heat generating device 130 for the first time, may be determined as $t_b$; then $T_B$ and $T_C$ may select any node between $t_a$ and $t_b$, for example, the temperatures of $(t_b-t_a)/3$ and $2(t_b-t_a)/3$. Similarly, $P_2$ may be determined as follows: $P_1$ and $P_3$ may be selected as the upper limits of the power of the heat generating device and lower limits of the power of the heat generating device. In the state of the $P_1$, under the condition of the $T_A$, the required time from a stable temperature deviation in the non-operating state of the heat generating device 130 to the stable temperature deviation in the running state of the heat generating device 130 for the first time, may be determined as $t_c$; in the state of $P_1$, under the condition of the $T_A$, the required time from a stable temperature deviation in the non-operating state of the heat generating device 130 to the stable temperature deviation in the running state of the heat generating device 130 for the first time, may be determined as $t_d$; then any node between $t_a$ and $t_b$, for example, the temperature of $(t_c-t_d)/2$, may be selected. In some embodiments, the temperature deviation may be a deviation of the measured value of the current ambient temperature relative to the measured value of the ambient temperature reference ambient temperature.

The stable temperature deviation may refer to a temperature deviation reached after the heat generating device 130 remains in the running state or the non-operating state for a long time. The longer time herein may be 1 hour, 2 hours, 5 hours or other time.

The compensating sub-unit 630 may generate the compensated data of the measured value of the current temperature. In some embodiments, the measured value of the current temperature may be obtained by the first sensing device 201. In some embodiments, the compensating sub-unit 630 may select a quasi-reference temperature time relationship of one or more measured value of the current temperature and generate a compensating temperature relationship. In some embodiments, N reference temperature time relationships closer to the current measurement condition may be selected as the quasi-reference temperature time table, wherein N may refer to any positive integer. Herein, the "closer" may refer to a ratio of one or more measurement conditions in the temperature time table (e.g., the measured value of the ambient temperature, a measured value of the ambient humidity, or the electric power value) to the values of current corresponding measurement conditions may not exceed a range, for example, 95% to 105%, 90% to 110%, or 85% to 115%. In some embodiments, the compensating sub-unit 630 may generate the compensating temperature time table according to the quasi-reference temperature time table. As an example, the compensating sub-unit 630 may perform a fitting calculation against the quasi-reference temperature time table to generate a compensating temperature table. In some embodiments, the compensating sub-unit 630 may also compensate for the current measured value of the temperature according to the compensating temperature time table. The fitting calculation method herein may be a combination of one or more of the aforementioned interpolation methods or the aforementioned extrapolation methods.

It should be noted that the above description of the data processing unit 420 is merely provided for convenience of description and not intended to limit the present disclosure to the scope of the embodiments. For persons having ordinary skills in the art, modules may be combined in various ways, or connected with other modules as sub-systems, and various modifications and transformations in form and detail may be conducted under the teaching of the present disclosure. However, those modifications and transformations may not depart from the spirit and scope of the present disclosure. For example, the preprocessing sub-unit 610 and the generating sub-unit 620 may be combined without the preprocessing sub-unit 610 being reserved. For another example, the generating sub-unit 620 and the compensating sub-unit 630 may be combined, and the compensating sub-unit 630 may implement the aforementioned function of the generating sub-unit 620. In some embodiments, the environmental parameter measurement system 110 may not have the generating sub-unit 620. The reference temperature time relationship used by the environmental parameter measurement system 110 for compensating the measured value of the current environmental parameter may be obtained from the storage device internal to the system 110 (the data obtaining module 221, the user control module 223, the storage module 225, etc.) or the external storage device (e.g., a database on a network, the smartphone, the tablet computer, the laptop computer, a wearable device, or other device, etc.). In some embodiments, the obtained reference temperature time relationship may be measured and obtained by a system having a similar arrangement of the heat generating device 130 and the first measuring device 201 in the environmental parameter measuring system 110. See FIG. 8 and its description.

Figure 7:
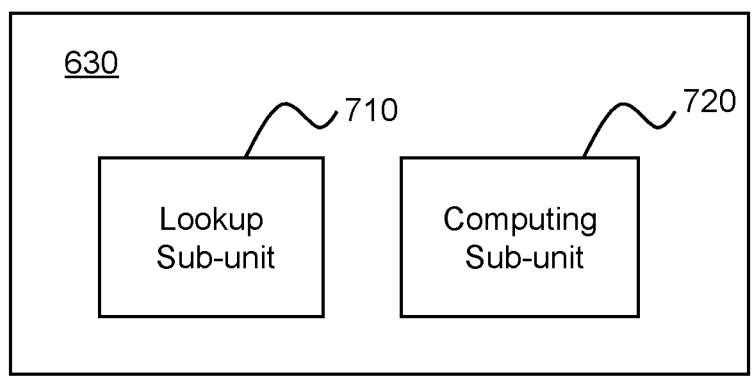
FIG. 7 is a schematic diagram illustrating a compensating sub-unit according to some embodiments of the present disclosure.

FIG. 7 is a schematic diagram illustrating a compensating sub-unit 630 according to some embodiments of the present disclosure. The compensating sub-unit 630 may include a lookup sub-unit 710 and a computing sub-unit 720. The lookup sub-unit 710 may look up and select the quasi-reference temperature time relationship in the reference temperature time relationship. In some embodiments, the lookup sub-unit 710 may select one or more reference temperature time relationships close to the current measurement conditions (e.g., the measured value of the current ambient temperature and the electric power value of the heat generating device 130, etc.) as the quasi-reference temperature time table. Herein, the "close" may refer to the ratio of one or more measurement conditions (e.g., the measured value of ambient temperature, the measured value of ambient humidity, or the power value of the heat generating device 130) of the reference temperature time relationship to the value of the current corresponding measurement condition may not exceed a range, for example, 95% to 105%, 90% to 110%, or 85% to 115%.

The computing sub-unit 720 may perform a calculation according to the found quasi-reference temperature time relationship, and generate the compensated temperature time relationship. In some embodiments, the computing sub-unit 720 may perform a fitting calculation (e.g., a combination of one or more of interpolation, extrapolation, etc.) on the found quasi-reference temperature time relationship to generate the compensating temperature time relationship. In some embodiments, the computing sub-unit 720 may calculate according to the compensating temperature time relationship, generate the compensated value of the current measured value of the temperature, and perform compensation on the current measured value of the temperature. As an example, the computing sub-unit 720 may perform linear interpolation or extrapolation based on the compensating temperature time relationship to generate a compensated value. The computing sub-unit 720 may also calculate the compensated value according to other algorithms, for example, other interpolation methods or extrapolation methods. More details on the interpolation methods and the extrapolation methods, please refer to the above, and will not be repeated herein.

It should be noted that the above description of the compensating sub-unit 630 is merely provided for convenience of description and not intended to limit the present disclosure to the scope of the embodiments. For persons having ordinary skills in the art, upon understanding the principle of the system, modules may be combined in various ways, or connected with other modules as sub-systems. Various variations and modifications may be made under the teachings of the present disclosure. However, those variations and modifications may not depart from the spirit and the scope of the present disclosure. For example, in some embodiments, for example, when the compensating temperature time table contains the same or substantially the same temperature data as the current measured value of the temperature, the computing sub-unit 720 may also directly obtain the compensated value of the current measured value of the temperature by the compensating temperature time relationship without the linearity. Interpolation or the extrapolation process. The "substantially the same" may refer to the error between the environmental parameter and the measured value of the environmental parameter after the compensation is within the range of system 110 or the range allowed by the user.

Figure 8:
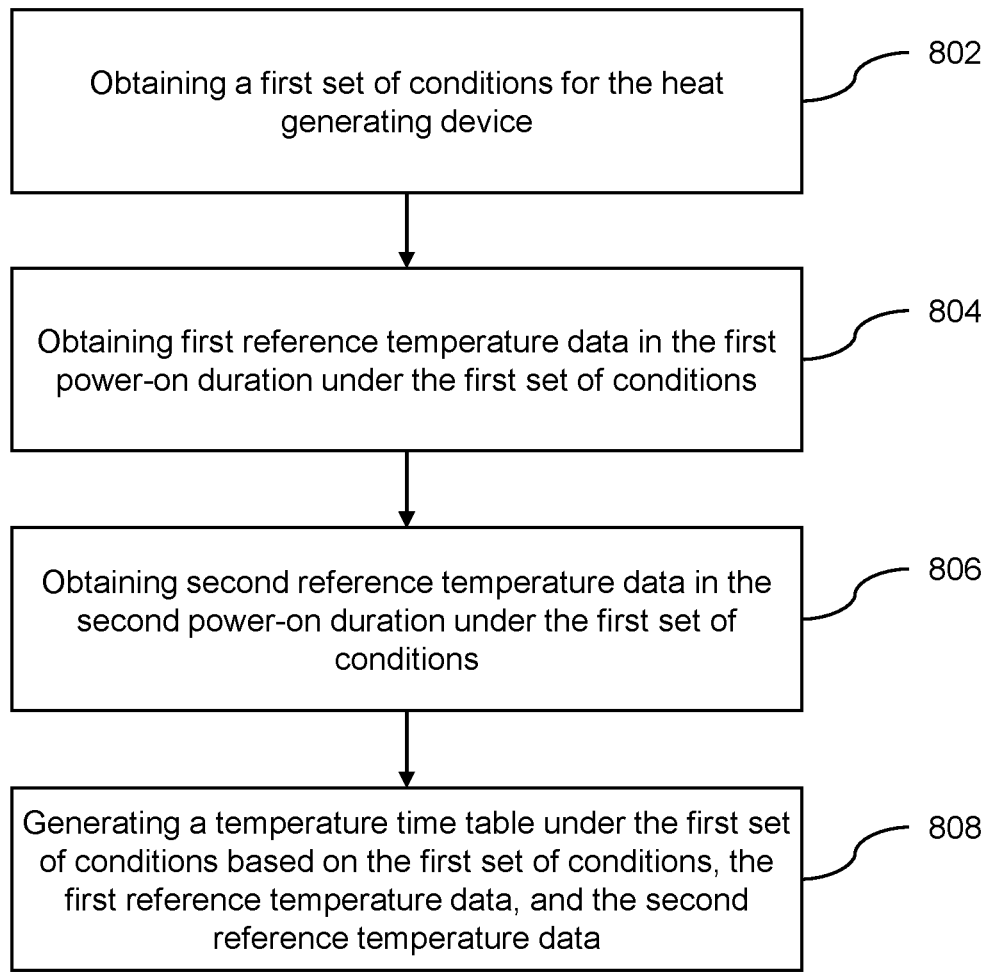
FIG. 8 is a flowchart illustrating an exemplary process for generating a reference temperature time table according to some embodiments of the present disclosure.

FIG. 8 is an exemplary flowchart for generating a reference temperature time relationship according to some embodiments of the present disclosure. In step 802, a first set of conditions for the heat generating device 130 may be obtained. The first set of conditions may be a combination of one or more measurement conditions. The measurement conditions may include the electric power of the heat generating device 130, the measured value of the ambient temperature, and other parameters that may affect the measurement of the environmental parameter, for example, a wallpaper material of the environment in which the system 110 is located, or the like, or any combination thereof. As an example, the first set of conditions may be a combination of the electric power of the heat generating device 130 and the measured value of the ambient temperature. For example, the first set of conditions may be that electric power of the heat generating device is 90 watts and the measured value of the ambient temperature is 30° C.

In step 804, a first reference temperature may be obtained in a first power-on duration of the heat generating device 130 under the first set of conditions. In some embodiments, the first reference temperature may be measured by the second sensing device 120. The first power-on duration may be any time period $t_1$ of the device powered on. For example, $t_1$ may be selected as 5 seconds, 10 minutes, 1 hour, etc. As an example, under the first set of conditions, such as the electric power of the heat generating device as 90 watts and the measured value of the ambient temperature as 30° C., in the first power-on duration of the heat generating device, for example, $t_1$ as 1 hour, the first reference temperature S1 at this time may be obtained by the second sensing device 120. In some embodiments, the measured value of the first ambient temperature may be obtained by the first sensing device 201 at the same time when the first reference temperature is obtained, that is, in the first power-on duration. The measured value of the first ambient temperature may be a measured value of the ambient temperature obtained by the first sensing device 201 while the first reference temperature obtained. The first measurement deviation of the ambient temperature may be obtained according to the measured value of the first ambient temperature and the first reference temperature as S1.

In step 806, a second reference temperature may be obtained in the second power-on duration of the heat generating device 130 under the first set of conditions. In some embodiments, the second reference temperature may be measured by the second sensing device 120. The second power-on duration may be any time period $t_2$ ($t_2 > t_1$) when the device is powered on. For example, t2 may be selected as 6 seconds, 16 minutes, 2 hours, etc. As an example, under the conditions of the first set, such as the electric power of the heat generating device as 90 watts and the measured value of the ambient temperature as 30° C., in the second power-on duration of the heat generating device, for example, when t2 is 2 hours, the second reference temperature S2 at this time may be obtained by the second sensing device 120. In some embodiments, the measured value of the second ambient temperature may be obtained by the first sensing device 201 while the second reference temperature is obtained, that is, in the second power-on duration. The measured value of the second ambient temperature may be a measured value of the ambient temperature obtained by the first sensing device 201 while the second reference temperature is obtained. A second measurement deviation of the ambient temperature may be obtained according to the measured value of the second ambient temperature and the second reference temperature data S2.

In step 808, the reference temperature time relationship under the first set of conditions may be generated based on the first set of conditions, the first reference temperature data, and the second reference temperature data. As an example, the first reference temperature (or the first measurement deviation), the second reference temperature (or the second measurement deviation), the first power-on duration and the second power-on duration, may generate a temperature time relationship representing the temperature time relationship under the first set of conditions. As an example, under the first set of conditions, for example, electric power of the heat generating device as 90 watts, and the measured value of the ambient temperature as 30° C., the reference temperature time relationship may be generated according to the first reference S1, the second reference S2, the first power-on duration 1 hour, and the second power-on duration 2 hours.

The reference temperature time relationship for the system 110 may be generated prior to installation of the system 110. For example, a manufacturer of the system 110 or a portion thereof may generate one or more reference temperature time relationships for the arrangement of the heat generating device 130 and the first measurement device 201. In some embodiments, the one or more reference temperature time relationship may be generated by the second environmental parameter measurement system. The second environmental parameter measurement system has the heat generating device and the measuring device. In some embodiments, the effect of the heat generating device of the second environmental parameter measurement system on its measuring device may be similar to the effect of the heat generating device 130 on the first measuring device 201. As an example, the arrangement of the heat generating device and the measuring device of the second environmental parameter measurement system, for example, a distance or the like, may be the same as or similar to the arrangement of the heat generating device 130 of the environmental parameter measurement system 110 and the first measuring device 201. As another example, the user may debug and generate a reference temperature time relationship suitable for the system 110. As an example, the user may collect data during the commissioning of the first measurement device (e.g., one week, one month, etc.), in conjunction with data collected by the second sensing device during this time, to generate the aforementioned reference temperature time relationship. For another example, the system 110 is officially used for a period of time, for example, one month, one quarter, one year, etc., the user may re-commission the system 110 and update the existing reference temperature time relationship table. In some embodiments, the existing reference temperature time relationship table may be generated during the debugging process before the official use, or loaded into the system 110 by the manufacturer before leaving the factory.

It should be noted that the above description of the process of generating the temperature time relationship is merely provided for convenience of description and not intended to limit the present disclosure to the scope of the embodiments. For persons having ordinary skills in the art, upon understanding the principle of the system, modules may be combined in various ways, or connected with other modules as sub-systems. Various variations and modifications may be made under the teachings of the present disclosure. However, those variations and modifications may not depart from the spirit and the scope of the present disclosure. For example, the flowchart is only used as an embodiment of a temperature environmental parameter compensation, and the temperature may be replaced with other environmental parameters, such as humidity, air pressure, partial pressure, airborne particulate matter contents, etc., to achieve a corresponding environmental parameter compensating effect. For another example, under the second group condition, the third group condition . . . , the Nth group condition, the step 802 to the step 808 may be respectively implemented to obtain the temperature time table under different conditions.

Figure 9:
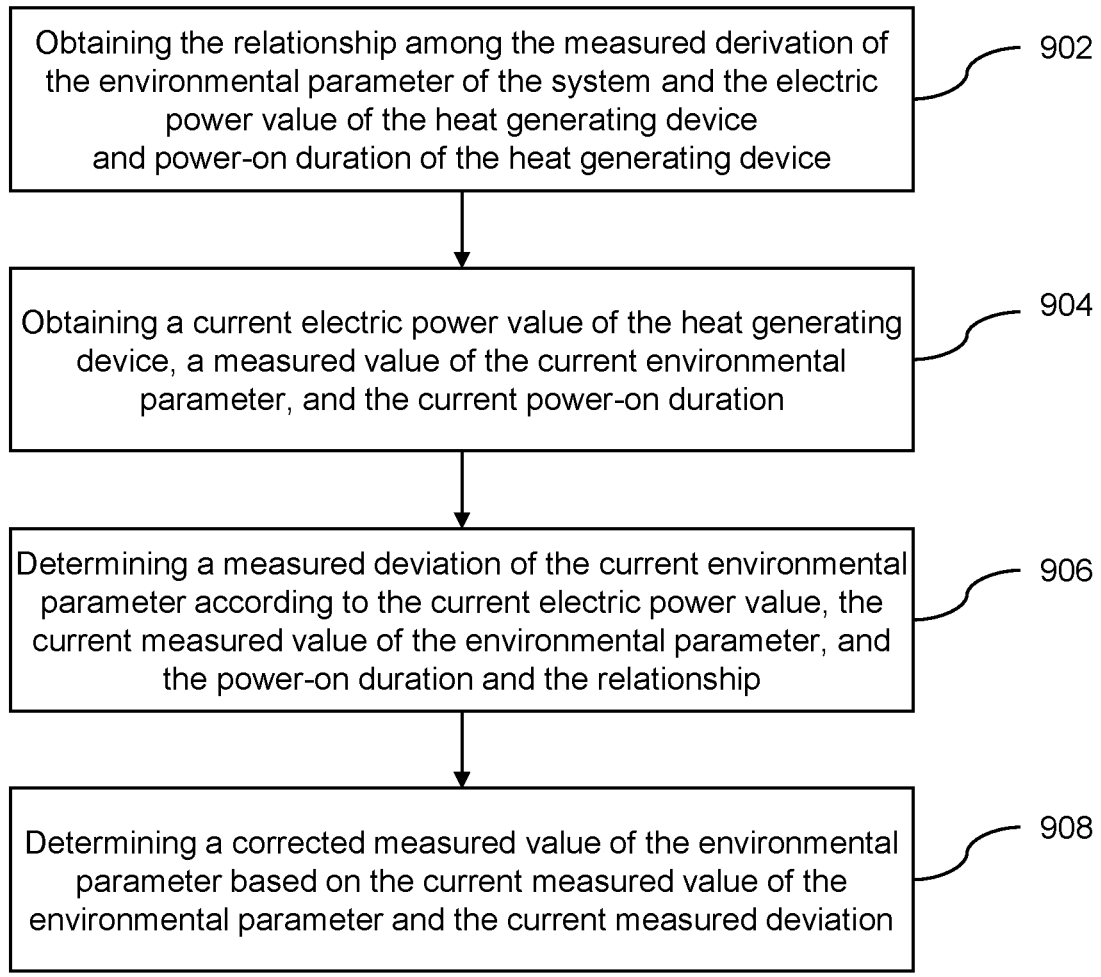
FIG. 9 is a flowchart illustrating an exemplary process for compensating the current measured values of the environmental parameter according to some embodiments of the present disclosure.

FIG. 9 is an exemplary flowchart for compensating the measured value of the current environmental parameter according to some embodiments of the present disclosure. In step 902, the relationship among the measured derivation of the environmental parameter of system 110, the electric power value of the heat generating device of the system 110 and the power-on duration of the heat generating device of the system 110 may be obtained. The measured deviation of the environmental parameter may be the deviation of the measured value of the environmental parameter and the corresponding reference data.

In step 904, the current electric power value of the heat generating device, the power-on duration of the heat generating device, and the measured value of the current environmental parameter may be obtained. In some embodiments, the measured value of the current environmental parameter may be measured and obtained by the first sensing device 201. The first sensing device 201 may be deployed near the heat generating device 130. In some embodiments, when the measured value of the environmental parameter is obtained, the electric power and the power-on duration of the heat generating device 130 may be the current electric power value and the current power-on duration, respectively.

In step 906, a measured deviation of the current environmental parameter may be determined according to the current electric power value, the current power-on duration, the current measured value of the environmental parameter and the relationship. In some embodiments, the existing reference data may be selected according to the current electric power value of the heat generating device and the measured value of the current environmental parameter. In some embodiments, the reference data measured under a set or sets of measurement conditions that are closer to the current electric power value and the measured value of the current environmental parameter may be selected. The "closer" may refer to the ratio of one or more measurement conditions (for example, the measured value of the ambient temperature, the measured value of the ambient humidity, or the electric power value of the heat generating device) of the reference temperature time relationship to the value of the current corresponding measurement condition may not exceed a range, for example, 95% to 105%, 90% to 110%, or 85% to 115%, etc. The measurement condition may be a combination of the electric power value of the reference heat generating device and the measured value of a reference ambient temperature. In some embodiments, the reference temperature parameter time relationship of the selected different electric power of the reference heat generating device and the reference environmental parameter time relationship under the reference ambient temperature conditions may be the quasi-reference temperature time relationship. In some embodiments, a compensating temperature time relationship may be determined according to the selected quasi-reference environmental parameter time relationship. In some embodiments, according to the compensating environmental parameter time relationship, the measured value of the current environmental parameter and the power-on duration of the heat generating device 130, the measurement deviation of the current environmental parameter, that is, the current deviation (also referred to as "target deviation"), may be determined. As an example, the linear interpolation or the extrapolation may be performed based on the compensating temperature time relationship to generate the current deviation. The compensated value may also be calculated according to other interpolation methods, such as a Newton method, a linear interpolation method, a polynomial interpolation method, or extrapolation methods, for example, a linear extrapolation, an exponential extrapolation, a growth curve method and a trend extrapolation, etc.

In step 908, a corrected measured value of the environmental parameter may be determined based on the current measured value of the environmental parameter and the current measured deviation. As an example, the current measured value of the environmental parameter may be added to or subtracted from the current measured deviation to obtain the corrected (or "after the compensation") measured value of the environmental parameter.

It should be noted that the above description of the compensation process of the measured value of the current environmental parameter is merely provided for convenience of description and not intended to limit the present disclosure to the scope of the embodiment. For persons having ordinary skills in the art, modules may be combined in various ways, or connected with other modules as subsystems. Various variations and modifications may be made under the teachings of the present disclosure. However, those variations and modifications may not depart from the spirit and the scope of the present disclosure. For example, other selection or processing conditions may be added between the step 902 and the step 908. For example, the relationship among the obtained measured deviation of environment parameter of the device, the obtained electric power value of the device, and the obtained power-on duration of the device may be stored and backed up. Similarly, the storage backup step may be added between any two steps in the flowchart. For example, in some cases, if the conditions of the power-on duration, the current measured value of the environmental parameter, or the electric power value of the heat generating device 130 and/or the power-on duration of the heat generating device 130 correspond to the existing compensating temperature time relationship, the compensated value may be generated by directly querying the data in the compensating temperature time relationship.

Figure 10:
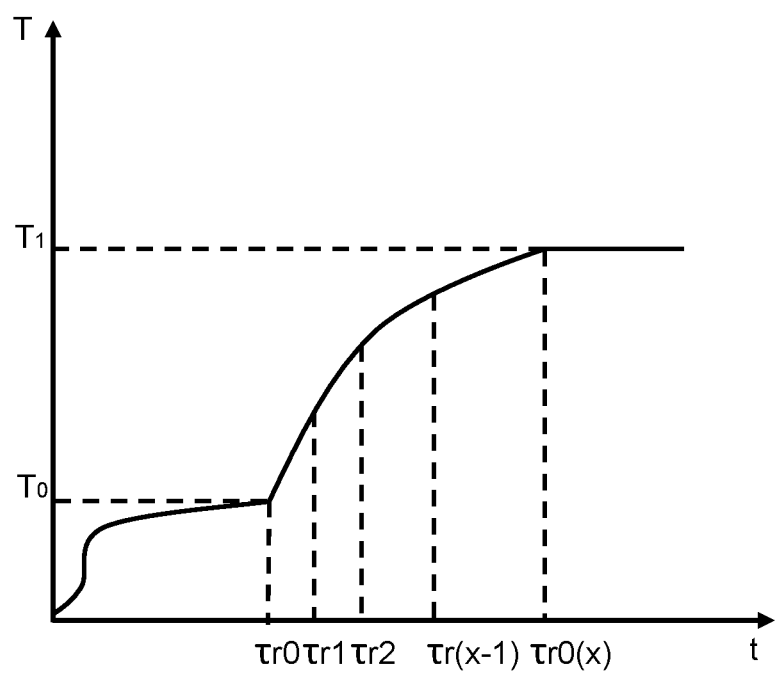
FIG. 10 is a schematic diagram illustrating a relationship between the reference temperature and the time according to some embodiments of the present disclosure.

FIG. 10 shows a schematic diagram of the reference temperature time relationship (the power of the heat generating device 130 remains unchanged) according to some embodiments of the present disclosure. The reference temperature time relationship may be expressed in the form of a table or function curve. As shown in FIG. 10, the temperature time relationship shows the relationship between the deviation for the measured value of the current ambient temperature of the first sensing device 201 relative to the measured value of the reference ambient temperature (referred to as "temperature deviation") and the power-on duration of the heat generating device 130. Wherein $T_0$ may be the stable temperature deviation reached by the heat generating device 130 in the non-operating state. $T_1$ may be the stable temperature deviation reached by the heat generating device 130 in the running time for a long time. The stable temperature deviation may refer to the temperature deviation reached after the heat generating device 130 remains in the running state or the non-operating state for a long time. The longer time herein may be 1 hour, 2 hours, 5 hours or other time periods. The time to reach the stable temperature deviation may be related to a combination of one or more factors such as the type of heat generating device 130, the electric power of the heat generating device 130, the ambient temperature, and the ambient humidity. $t_{r0}$, $t_{r1}$, $t_{r(x-1)}$, and $t_{rx}$ may respectively refer to the power-on duration of the heat generating device 130 of one unit temperature rising at a time, for example, 0.1° C., when the temperature deviation rises from $T_0$ to $T_1$.

Figure 11:
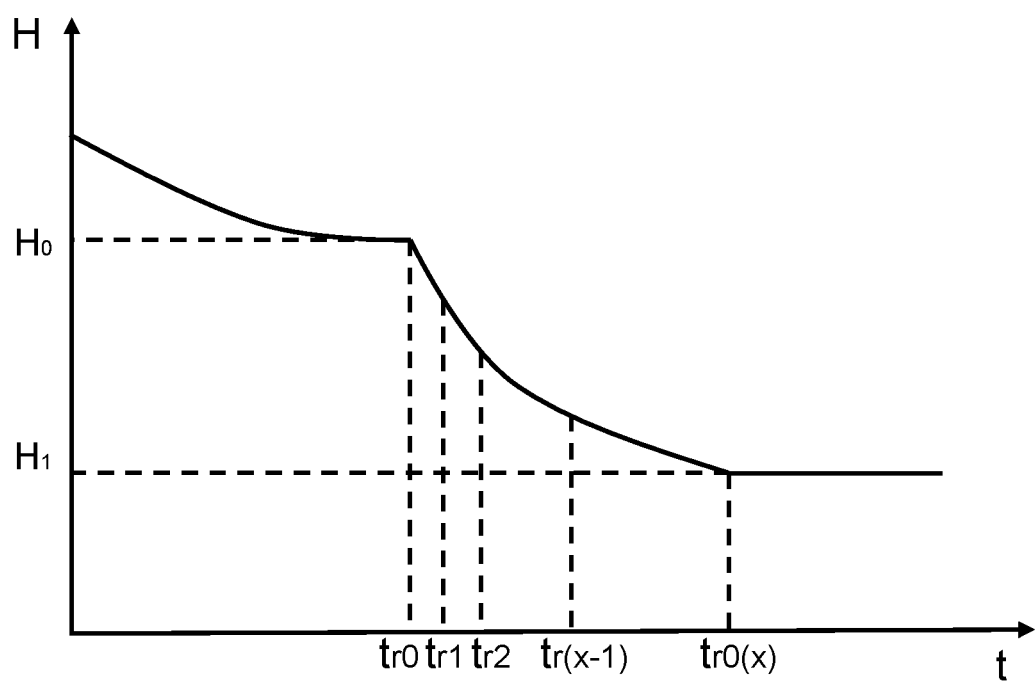
FIG. 11 is a schematic diagram illustrating the relationship between the reference humidity and the time according to some embodiments of the present disclosure.

FIG. 11 is a schematic diagram showing the reference humidity time relationship (the power of the heat generating device 130 remains unchanged) according to some embodiments of the present disclosure. The reference humidity time relationship may be represented by the table or the function curve. As shown in FIG. 11, the humidity time relationship shows the relationship between the deviation for the measured value of the ambient humidity relative to the reference ambient humidity deviation ("humidity deviation") and the power-on duration of the heat generating device 130. Wherein, $H_0$ may be the stable humidity deviation reached by the heat generating device 130 in the non-operating state. $H_1$ may be the stable humidity deviation reached by the heat generating device 130 in the running time for a long time. The time to reach the stable humidity deviation may be related to factors such as the type of heat generating device 130, the electric power of the heat generating device 130, the ambient temperature, and the ambient humidity, etc. $\tau_{r0}$, $\tau_{r1}$, $\tau_{r2}$, $\tau_{r(x-1)}$, $\tau_{rx}$ may respectively refer to the power-on duration of the heat generating device 130 of one unit temperature rising at a time, for example, 0.1 g/m³, when the humidity deviation rises from $T_0$ to $T_1$.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment.

Furthermore, the particular features, structures or characteristics may be combined as suitable in one or more embodiments of the present disclosure. Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, various aspects of the present disclosure may be implemented entirely by hardware, entirely software (including firmware, resident software, micro-code, etc.) or combining software and hardware. The above hardware or software may be referred to as "data block", "module", "engine", "unit", "component" or "system". Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. The program code embodied on a computer readable signal medium may be transmitted using any appropriate medium, including a wireless, cable, fiber optic cable, RF, or the like, or any combination of the medium.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". For example, "about," "approximate," or "substantially" may indicate ±20% variation of the value it describes, unless otherwise stated. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication and other materials cited herein, such as articles, books, instructions, publications, documents, articles, etc., are hereby incorporated by reference in their entirety, excepting any prosecution file history associated with same, any of same that is inconsistent with or in conflict with the present document, or any of same that may have a limiting affect as to the broadest scope of the claims now or later associated with the present document. It is to be noted that there should be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to the embodiments that are expressly introduced and described herein.

What is claimed is:

1. A system, comprising:
   at least one storage device including a set of instructions; and
   at least one processor in communication with the at least one storage device, wherein when executing the set of instructions, the at least one processor is configured to cause the system to:
   obtain one or more sets of conditions associated with a heat generating device, each set of the one or more sets of conditions including an electric power value of the heat generating device; and
   for each set of the one or more sets of conditions,
   obtain a plurality of groups of measured data associated with an environmental parameter corresponding to a set of time points in a power-on duration of the heat generating device, wherein the plurality of groups of measured data is acquired by a first sensing device;
   obtain a plurality of groups of reference data associated with the environmental parameter corresponding to the set of time points in a power-on duration of the heat generating device, wherein the plurality of groups of reference data is acquired by a second sensing device;
   determine, for each group of the plurality of groups of measured data and each group of the plurality of groups of reference data reference data, a deviation of the environmental parameter associated with the first sensing device between the measured data and the reference data; and
   determine a relationship between the deviation of the environmental parameter and the power-on duration of the heat generating device.

2. The system of claim 1, wherein the environmental parameter is temperature, relative humidity, absolute humidity, or pressure.

3. The system of claim 1, wherein a first distance between the first sensing device and the heat generating device is less than or equal to a first threshold.

4. The system of claim 1, wherein a second distance between the second sensing device and the heat generating device is greater than or equal to a second threshold.

5. The system of claim 1, wherein the second sensing device includes at least one of a temperature sensor, a humidity sensor, or a pressure sensor.

6. The system of claim 1, wherein to determine the relationship among the deviation of the environmental parameter and the power-on duration of the heat generating device, the at least one processor is further configured to cause the system to:
   determine, according to a fitting algorithm, the relationship based on the set of time points during the power-on duration and the deviation of the environmental parameter associated with the plurality of groups of measured data and the plurality of groups of reference data.

7. The system of claim 6, wherein the fitting algorithm includes at least one of an interpolation algorithm or an extrapolation algorithm.

8. The system of claim 7, wherein the extrapolation algorithm may include at least one of a linear extrapolation algorithm, an exponential extrapolation algorithm, a growth curve algorithm, or a trend extrapolation algorithm.

9. The system of claim 7, wherein the interpolation algorithm includes at least one of a Newton's algorithm, a linear interpolation algorithm, or a polynomial interpolation algorithm.

10. The system of claim 1, wherein the at least one processor is further configured to cause the system to:
    obtain a set of target conditions associated with the heat generating device, a target power-on duration of the heat generating device, and a target measured value of the environmental parameter that is measured by the first sensing device;
    determine a target deviation based at least in part on the set of target conditions, the target time, and the relationship;
    determine a corrected measured value of the environmental parameter based on the target measured value and the target deviation.

11. A method, comprising:
    obtaining one or more sets of conditions associated with a heat generating device, each set of the one or more sets of conditions including an electric power value of the heat generating device; and
    for each set of the one or more sets of conditions,
       obtaining a plurality of groups of measured data associated with an environmental parameter corresponding to a set of time points in a power-on duration of the heat generating device, wherein the plurality of groups of measured data is acquired by a first sensing device;
       obtaining a plurality of groups of reference data associated with the environmental parameter corresponding to the set of time points in a power-on duration of the heat generating device, wherein the plurality of groups of reference data is acquired by a second sensing device;
       determining, for each group of the plurality of groups of measured data and the plurality of groups of reference data, a deviation of the environmental parameter associated with the first sensing device between the measured data and the reference data; and
       determining a relationship between the deviation of the environmental parameter and the power-on duration of the heat generating device.

12. The method of claim 11, wherein the environmental parameter is temperature, relative humidity or absolute humidity.

13. The method of claim 11, wherein a first distance between the first sensing device and the heat generating device is less than or equal to a first threshold.

14. The method of claim 11, wherein a second distance between the second sensing device and the heat generating device is greater than or equal to a second threshold.

15. The method of claim 11, wherein the second sensing device includes at least one of a temperature sensor, a humidity sensor, or a pressure sensor.

16. The method of claim 11, wherein the determining a relationship among the deviation of the environmental parameter and the power-on duration of the heat generating device includes:
    determining, according to a fitting algorithm, the relationship based on the set of time points during the power-on duration and the deviation of the environmental parameter associated with the plurality of groups of measured data and reference data.

17. The method of claim 16, wherein the fitting algorithm includes at least one of an interpolation algorithm or an extrapolation algorithm.

18. The method of claim 17, wherein the extrapolation algorithm may include at least one of a linear extrapolation algorithm, an exponential extrapolation algorithm, a growth curve algorithm, or a trend extrapolation algorithm.

19. The method of claim 17, wherein the interpolation algorithm includes at least one of a Newton's algorithm, a linear interpolation algorithm, or a polynomial interpolation algorithm.

20. A non-transitory computer readable medium, comprising a set of instructions, wherein when executed by at least one processor, the set of instructions directs the at least one processor to effectuate a method, the method comprising:
    obtaining one or more sets of conditions associated with a heat generating device, each set of the one or more sets of conditions including an electric power value of the heat generating device; and
    for each set of the one or more sets of conditions,
       obtaining a plurality of groups of measured data associated with an environmental parameter corresponding to a set of time points in a power-on duration of the heat generating device, wherein the plurality of groups of measured data is acquired by a first sensing device;
       obtaining a plurality of groups of reference data associated with the environmental parameter corresponding to the set of time points in a power-on duration of the heat generating device, wherein the reference data is acquired by a second sensing device;
       determining, for each group of the plurality of groups of measured data and the plurality of groups of reference data, a deviation of the environmental parameter associated with the first sensing device between the measured data and the reference data; and
       determining a relationship between the deviation of the environmental parameter and the power-on duration of the heat generating device.

* * * * *